United States Patent [19]

Wohlford et al.

[11] Patent Number: 4,615,567
[45] Date of Patent: Oct. 7, 1986

[54] FLEXOR FOR SECTIONS OF ENDLESS TRACK

[75] Inventors: William P. Wohlford, Bettendorf; Nicolae V. Orlandea, Davenport, both of Iowa

[73] Assignee: Deere & Company, Moline, Ill.

[21] Appl. No.: 773,754

[22] Filed: Sep. 9, 1985

[51] Int. Cl.⁴ .................. B62D 55/24; B62D 55/28
[52] U.S. Cl. .................................... 305/40; 305/43; 16/225
[58] Field of Search ............ 474/202, 206, 207, 232, 474/233; 198/847, 850; 16/225, DIG. 13; 305/35 R, 38, 40-43

[56] References Cited

U.S. PATENT DOCUMENTS 1,774,815  9/1930  Robertson ........................... 305/43
4,451,097  5/1984  Wohlford ............................ 305/40

Primary Examiner—David A. Scherbel

[57] ABSTRACT

A flexor having its opposite ends clamped between respective link and grouser of adjacent track link sections includes a tensile load carrying core in the form of a pair of thin, generally rectangular plates. The ends of the plates where clamping bolts pass through are reinforced by a thickened section which diminishes in a direction toward the center of the plates. The opposite outer surfaces defined by the reinforcement is parabolic and terminates adjacent the midpoint between the opposite ends of the flexor. The reinforcements control the bending of the flexor so that the bend is a smooth circular curve, having the largest radius possible for a given length of flexor.

2 Claims, 3 Drawing Figures

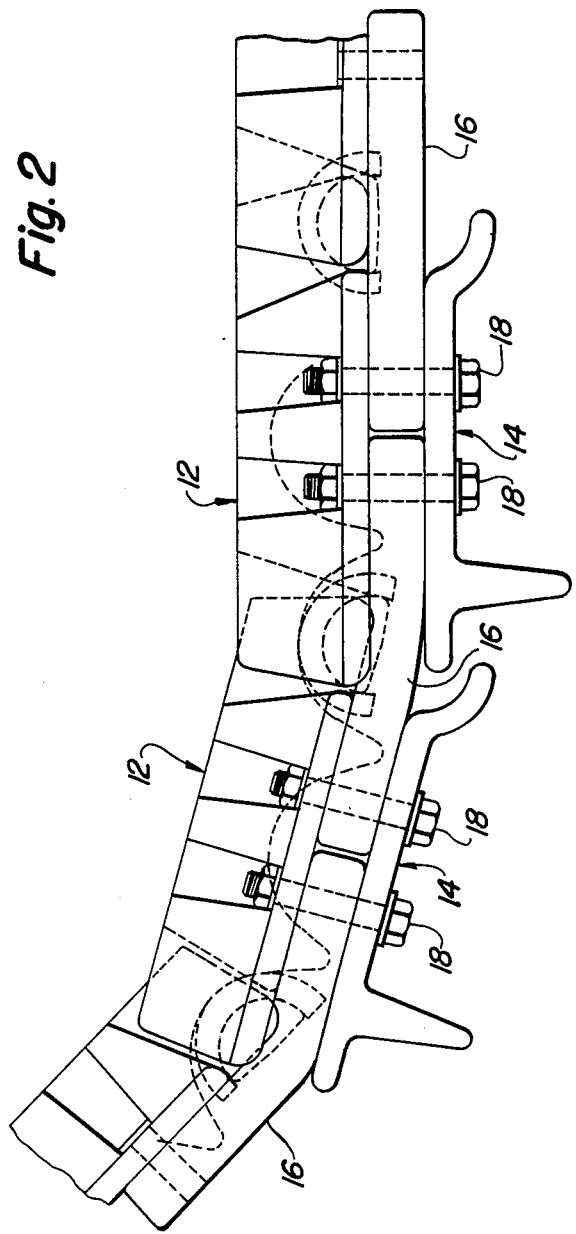
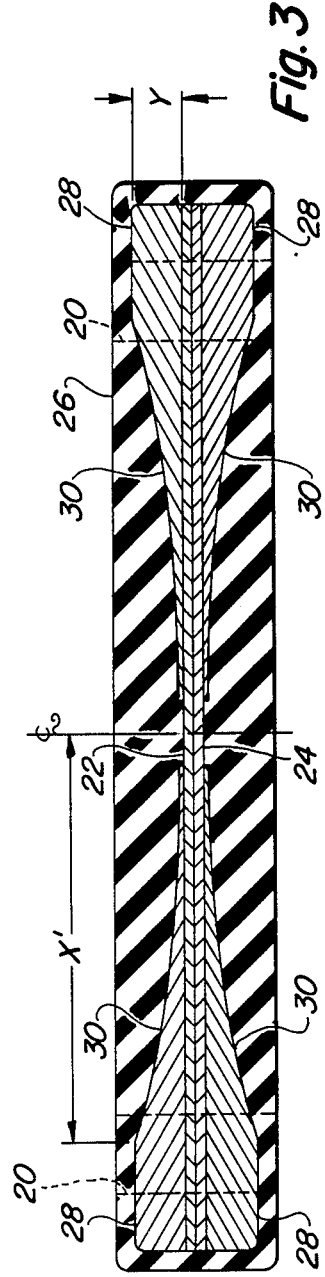

FLEXOR FOR SECTIONS OF ENDLESS TRACK

BACKGROUND OF THE INVENTION

The present invention relates to drive tracks for track-laying vehicles and more particularly relates to flexors embodied in track sections for interconnecting and providing flexure between adjacent sections.

U.S. Pat. No. 4,451,097 issued to Wohlford on May 29, 1984 discloses a track section including a pair of rectangular flexors, each having one end sandwiched between flat surfaces respectively of a link and grouser and having a second end adapted for being similarly sandwiched between the link and grouser of an adjacent track section whereby a plurality of sections may be interconnected to form an endless track. The link and grouser each have curved end surfaces adapted to control the radius of flexure of the flexors during operation, as when passing around the drive sprocket, for example. It has been found however that sand or other material finds its way to areas between the respective curved surfaces of the link and grouser and the flexor and results in the flexor bending sharper and thus being strained greater than is desirable.

SUMMARY OF THE INVENTION

According to the present invention there is provided an improved flexor for use in track sections of a type wherein the flexor has its end clamped between flat surfaces respectively of a link and grouser.

A broad object of the invention is to provide a flexor for a track section which is designed so as to reliably control the minimum radius of flexure, and hence the maximum strain the flexor undergoes during operation.

Another broad object is to design a flexor which makes it possible to eliminate the specially curved link and flexor surfaces formerly used to control the radius of flexure of the flexor.

A more specific object of the invention is to design the shape of the tensile load carrying flexor core so as to control the bend radius of the flexor.

These and other objects, features and advantages of the present invention will become apparent to those skilled in the art from the description which follows and from the drawing.

BRIEF DESCRIPTION OF THE DRAWING

FIG. 2 is a side elevational view showing a short portion of an endless track embodying link sections like that of FIG. 1 and with a drive sprocket engaged.

FIG. 3 is a vertical, longitudinal sectional view taken through a flexor and showing the end reinforcement structure which controls the radius of flexure of the flexor.

DESCRIPTION OF THE PREFERRED EMBODIMENT

Figure 1:
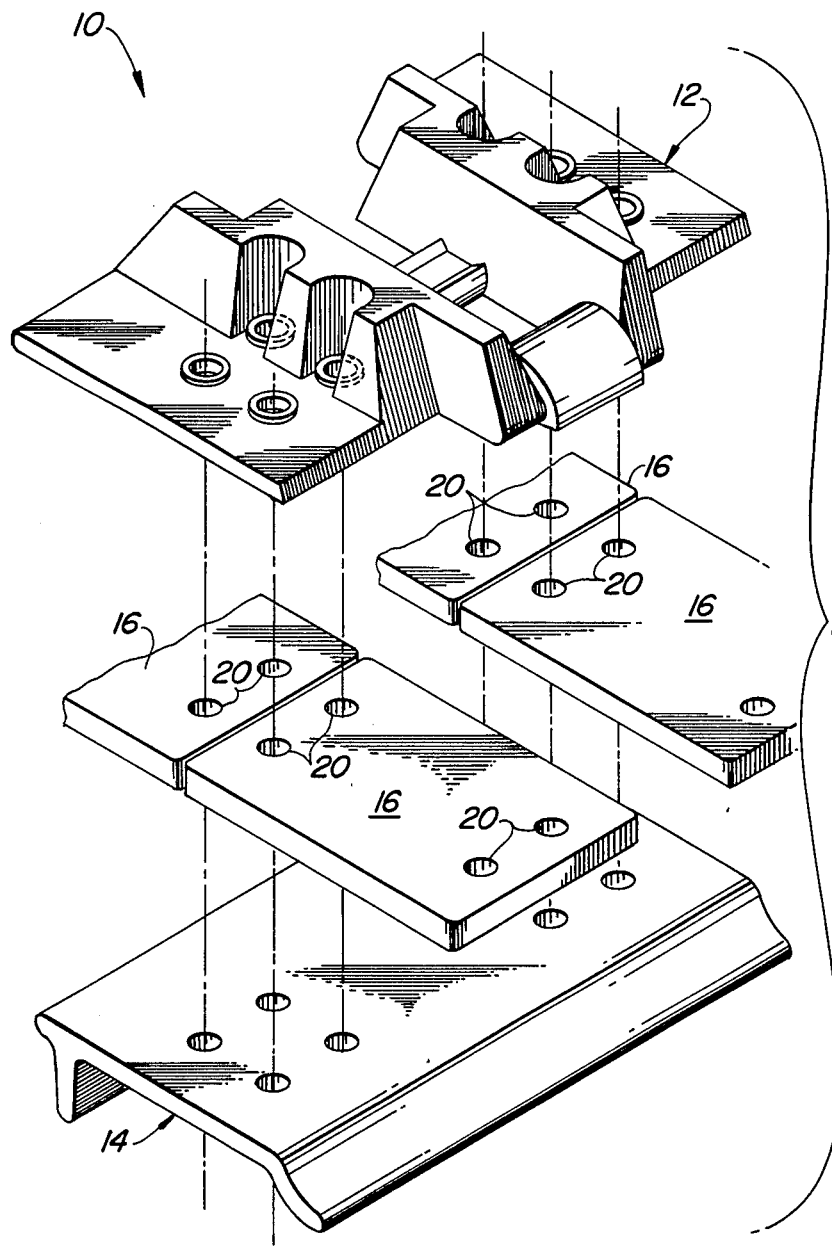
FIG. 1 is an exploded view of a track section embodying flexors constructed in accordance with the present invention.

Referring now to FIG. 1, there is shown a link section 10 adapted for interconnection with a plurality of like link sections for forming an endless track for use on a track-laying tractor, for example. The link section 10 includes a link 12 and grouser 14 secured in sandwiching relationship to first ends of a pair of flexors 16 by four bolts 18 which pass through pairs of holes 20 provided in each end of each flexor 16.

Referring now to FIG. 3, it can be seen that the flexor 16 includes upper and lower superposed rectangular plates 22 and 24, respectively located within an elastomeric casing 26. Secured to the upper surface of the upper plate 22 and the lower surface of the lower plate 24 are end reinforcements 28 with one pair of the holes 20 passing through the reinforcements at first ends of the plates 22 and 24 and another pair of the holes passing through the end reinforcements at the other end of the plates. The reinforcements 28 each have a surface 30 facing away from the associated plates 22 or 24. Each surface 30 is shaped in a curved fashion such that the bending deflection resulting from an angular applied load at the mounting holes 20 at the opposite ends of the flexor is a smooth circular curve, having the largest radius possible for a given length of flexor. The curved surface which theoretically results in a circular arc is characterized in the x and y directions shown in FIG. 3 by the equation $$y = \frac{y \min x^2}{x_1^2} + y \min;$$

where $x_1$ is the distance between the bolt holes 20 at one end of the flexor and the center line of the flexor, $y \min$ equals the thickness of the end reinforcement 28, $x$ is any arbitrary distance less than $x_1$ and $y$ is the corresponding vertical distance. The surfaces 30 are thus parabolic.

It is here noted that instead of the flexor plates and end reinforcements being constructed of separate pieces which are then bonded together, the final shape of the plate plus reinforcement could be obtained by machining a single piece of material.

Thus, it will be appreciated that by specially shaping the end reinforcements 28 in the way just described the radius of bending of the flexors 16 is precisely controlled and the problem of debris altering the desired bend radius, as is attendant with the previous design which used specially shaped link and grouser portions to control bending, is avoided.

We claim:

1. In a flexor for forming part of a track link section and having a tensile load carrying core including at least one rectangular, relatively thin plate encapsulated in an elastomeric casing, said plate having opposite ends reinforced by thickened end sections, mounting holes located in the opposite ends of the flexor and passing through the thickened end sections whereby the flexor, when installed in an endless track, is adapted for having its opposite ends sandwiched between respective link and grouser members of adjacent link sections, the improvement, comprising: said thickened end sections extending substantially to a location midway between the ends of the flexor; and each end section diminishing in thickness in a direction toward said location with the rate of diminishing thickness being such that when the flexor is bent the bend is a smooth circular curve.

2. The flexor defined in claim 1 wherein an outer surface of each of the thickened end sections is parabolic.

* * * * *